United States Patent [19]

Walter

[11] Patent Number: 4,767,274
[45] Date of Patent: Aug. 30, 1988

[54] MULTIPLE LUG BLADE TO DISK ATTACHMENT

[75] Inventor: Jerry D. Walter, North Palm Beach, Fla.

[73] Assignee: United Technologies Corporation, Hartford, Conn.

[21] Appl. No.: 947,348

[22] Filed: Dec. 29, 1986

[51] Int. Cl.$^4$ .............................................. F01D 5/30
[52] U.S. Cl. .................... 416/193 A; 416/217; 416/219 R
[58] Field of Search ............... 416/217, 220 R, 221, 416/219 R, 198 A, 193 A, 212 A

[56] References Cited

U.S. PATENT DOCUMENTS

| | | | |
|---|---|---|---|
| 1,500,787 | 7/1924 | Anderson | 416/217 |
| 1,720,729 | 7/1929 | Hanzlik | 416/219 R |
| 2,619,318 | 11/1952 | Schaer | 416/219 |
| 2,625,366 | 1/1953 | Williams | 416/217 |
| 2,635,848 | 4/1953 | McDowell | 416/217 |
| 2,639,119 | 5/1953 | Greenwald | 416/217 |
| 2,751,189 | 6/1956 | Ledwith | 416/217 X |
| 2,790,620 | 4/1957 | Rankin | 416/217 |
| 2,805,838 | 9/1957 | Pickup | 416/217 |
| 2,861,775 | 11/1958 | Whitehead | 416/220 R |
| 3,014,695 | 12/1961 | Rankin et al. | 416/220 R |
| 4,321,012 | 3/1982 | Tan | 416/217 |
| 4,483,054 | 11/1984 | Ledwith | 416/219 R X |

FOREIGN PATENT DOCUMENTS

| | | | |
|---|---|---|---|
| 528031 | 11/1921 | France | 416/217 |
| 26210 | 2/1982 | Japan | 416/220 R |
| 26209 | 2/1982 | Japan | 416/220 R |
| 210104 | 12/1982 | Japan | 416/220 R |
| 226202 | 12/1984 | Japan | 416/219 R |
| 740757 | 11/1955 | United Kingdom . | |
| 2003994 | 3/1979 | United Kingdom | 416/193 A |

Primary Examiner—Everette A. Powell, Jr.

[57] ABSTRACT

Structure for retaining rotor blades of a disk and blade assembly of a rotary machine is disclosed. A plurality of blade lugs extend from beneath the platform of each rotor blade into engagement with a corresponding plurality of disk slots. In a preferred form the disk slots are formed to a helical geometry across the periphery of the disk.

4 Claims, 3 Drawing Sheets

MULTIPLE LUG BLADE TO DISK ATTACHMENT

TECHNICAL FIELD

This invention relates to axial flow rotary machines and more particularly to the attachment of blades to a blade supporting disk within such an engine.

The concepts were developed for use in the fan and compressor sections of gas turbine engines, but have wider applicability within gas turbine engines and similar machinery as well.

BACKGROUND ART

The principal elements of an axial flow rotary machine, such as gas turbine engines, are a rotating assembly or rotor and a stationery assembly or stator. Flow directing vanes of the rotor extend outwardly across a flowpath for working medium gases into proximity with the stator. Flow directing vanes of the stator extend inwardly across the flowpath from medium gases into proximity with the rotor. In a typical structure, blades of the rotor are attached to a blade supporting disk by an interlocking structure formed of the blades and of the disk.

In the compressor sections of modern gas turbine engines the interlocking structure most typically includes slots extending axially across the rotor disk and single lugs of corresponding geometry extending inwardly from the base of each blade into engagement with the disk slots. Such interlocking structures are highly successful and have been used for many years by designers and builders of jet engines throughout the world.

Notwithstanding the availability and proven success of such designs, scientists and engineers within the gas turbine industry continue to search for yet improved attachment structures.

DISCLOSURE OF INVENTION

According to the present invention each blade of a gas turbine engine rotor stage has a plurality of blade root lugs formed to engage a corresponding plurality of slots of a blade supporting disk of that stage from the front face to the rear face of the disk.

A primary feature of the present invention is the multiple points of engagement of the blade with the supporting disk. Each blade has a plurality of root lugs spaced along the base of the blade. Slots extending about the periphery of the blade supporting rotor are engaged by the blade root lugs. Slot depths are diminished in comparison to the depths of designs utilizing a single slot for retention of equivalently sized blades.

The use of multiple root attachment points in accordance with the present invention is particularly well suited to the retention of relatively heavy blades. Overall weight of the disk and blade assembly is reduced through reductions in the amount of disk material in the dead ring. Reduced slot depths maximize the load carrying capability of equivalent disk material. Improved stress distributions occur both within the disk and the blades as the bending moment on one side of each root lug are opposed by a corresponding moment on the other side of the root lug. In one embodiment helical attachment slots facilitate assembly of the blades.

Other features and advantages will be apparent from the specification and claims and from the accompanying drawing which illustrates an embodiment of the invention.

BEST MODE FOR CARRYING OUT THE INVENTION

Figure 1:
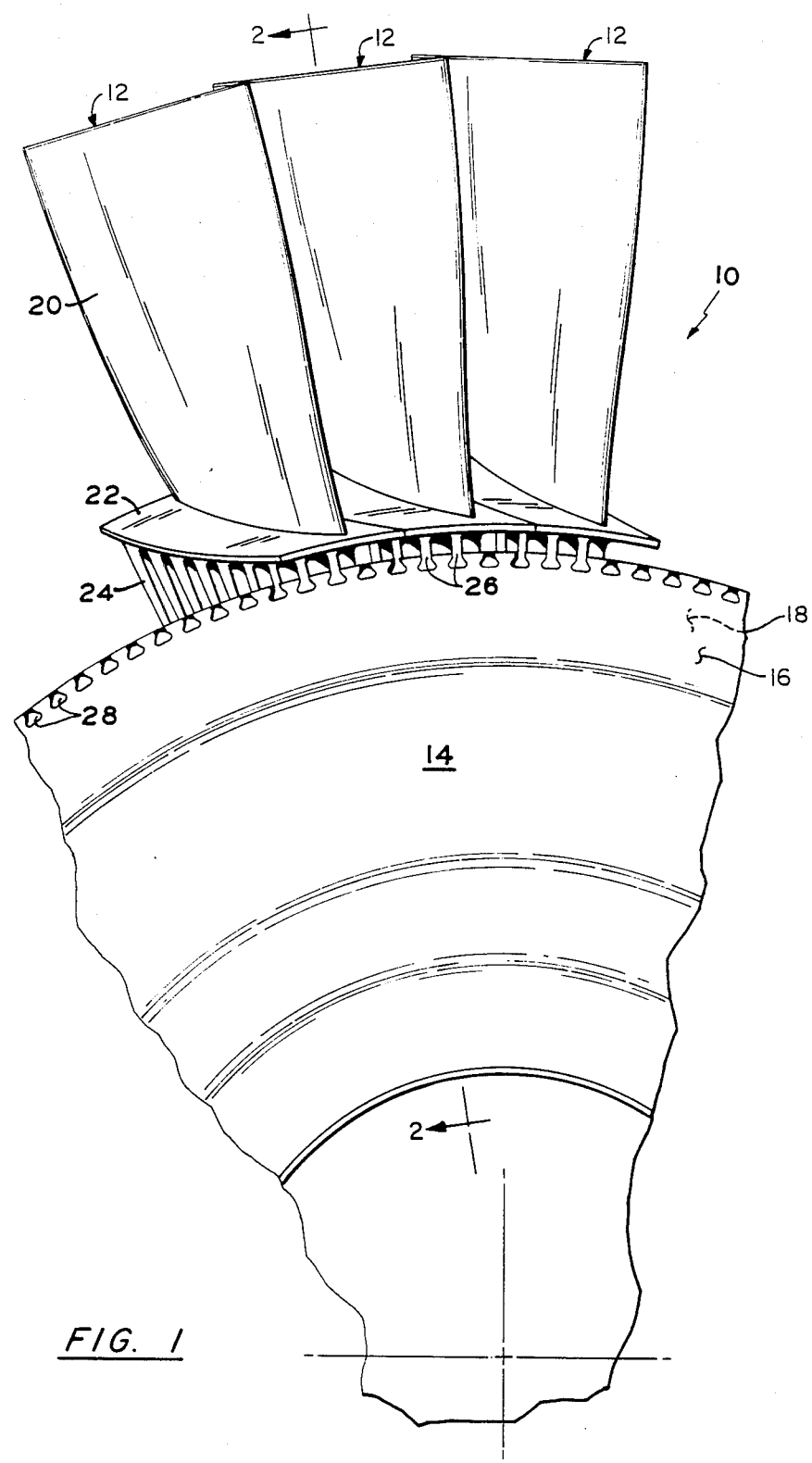
FIG. 1 is a simplified, front view illustration of a portion of the rotor assembly of a gas turbine engine.

As is shown in FIG. 1, a single stage 10 of the rotor assembly of a gas turbine engine is principally formed of a plurality of blades 12 which extend radially outwardly from a blade supporting disk 14. The disk has a front face 16 and a rear face 18. The illustration shown is representative of compressor applications, but the concepts are equally applicable to turbine designs as well.

Figure 2:
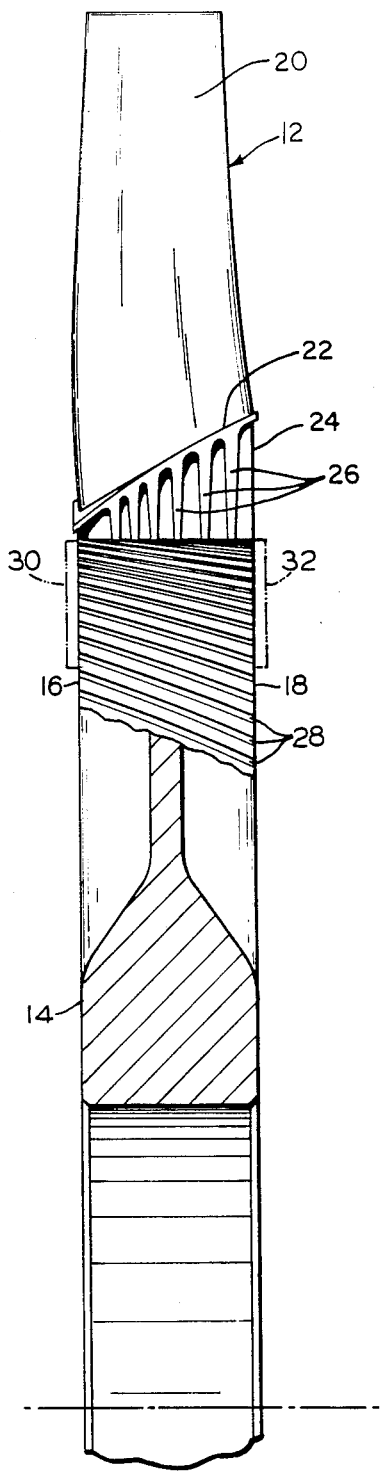
FIG. 2 is a simplified, cross-sectional view taken along the line 2—2 of FIG. 1 showing multiple points of attachment of the blade to the blade supporting disk.

More particularly, in FIG. 2 each blade 12 has an airfoil section 20, a platform section 22 and a root section 24. The root section of a blade formed in accordance with the present invention includes a plurality of root lugs 26 extending beneath the platform section. The root lugs shown are configured to a "dovetail" geometry. Each lug engages a correspondingly contoured slot 28 in the blade supporting disk 14. The lugs and slots illustrated have a "dovetail" type geometry commonly utilized in the compressors of such engines. Other slot geometries may be utilized with the concepts of the present invention, and in particular, "fir tree" type geometries are known to be more suitable for turbine structures.

The slots, as shown, follow a helical pattern along the axis of the disk thereby enabling each blade to be threaded onto the disks with additional lugs sequentially engaging the next slot as the blade travels along the disk to the installed location as shown. An upstream coverplate 30 at the front face 16 of the disk and a downstream coverplate 32 at the rear face 18 of the disk complete the assembly by preventing axial movement of the blade with respect to the disk once the coverplates are installed.

Figure 3:
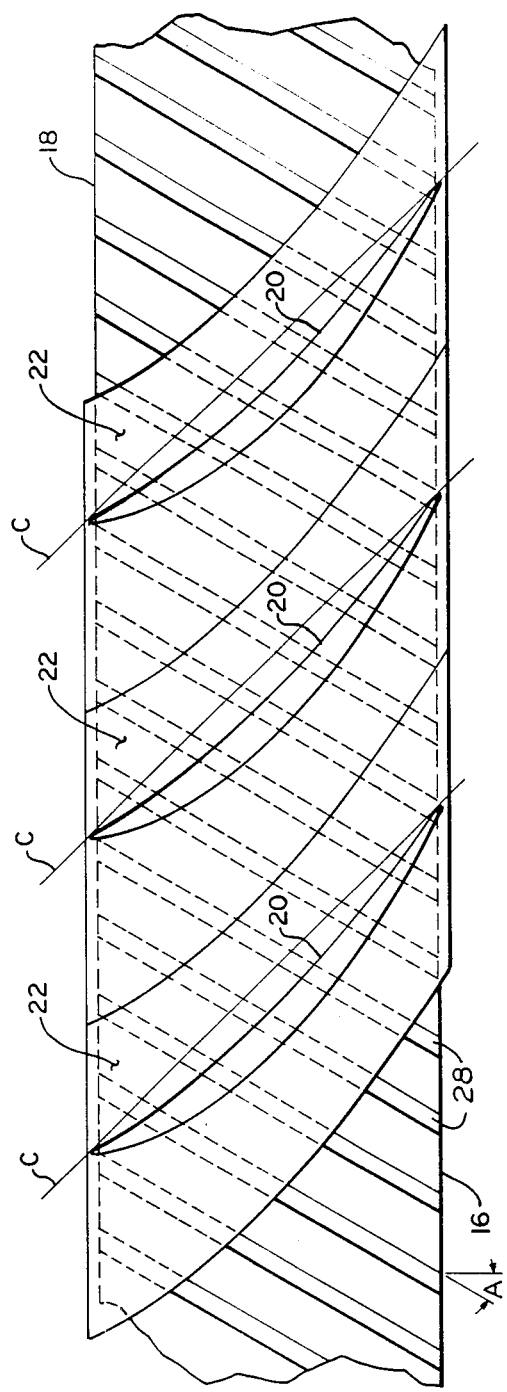
FIG. 3 is a developed view of a perimeter of the blade supporting disk with blades installed.

FIG. 3 is a developed view of the periphery of the disk 14 illustrating the helical pitch of the slots 28 in the embodiment depicted. A thirty degree (30°) angle of advance, or broach angle A to the slots is used in the embodiment shown. Larger or smaller angles of advance may be utilized dependent upon the structure in which the invention concepts are employed. The corresponding root lugs of each blade are identically positioned on each blade beneath the platform section along the blade chord line C. Identical root lugs for each blade can be a significant advantage; each of the blades can then be manufactured to the same geometry under a single part number.

The above-described attachment design employing multiple blade to disk attachment points is especially suited to use with low aspect ratio airfoils having relatively long chord lengths. The multiple attachment locations along the blade chord causes the centrifugally generated blade loads, during operation of the engine, to be evenly distributed to the disk material.

Two aspects of the design of a disk and blade system in accordance with the concepts of the present invention enable substantial weight reductions. Both involve reductions in the volume of the dead ring portion of the disk: increased hoop stress carrying material and decreased disk material volume. The dead ring is that portion of the disk above the bases of the blade root slots. Material in that region is not circumferentially continuous across the slots, and therefore, has no ability to carry disk hoop stresses. Reducing the depths of the slots reduces the radial height of the dead ring material and increases the amount of circumferentially continuous material. Thusly, the load carrying capability of a disk of equivalent diameter is increased. The slot depths may be reduced by an appropriate amount inversely proportional to the number of disk lugs on each blade.

Additionally, the volume of disk material can be further reduced by moving the radial position of the disk slots inwardly. In such a design, the length of the blade lugs is necessarily increased to maintain the identical working medium flow path diameter, but this increase in blade weight and in disk width needed to restrain the heavier blades is more than offset by the concomitant disk weight reduction. Reductions in disk weight, made possible by reducing the diameter of the disk, are reduced by the square of the disk radius, whereas increases in disk weight made necessary by the heavier blades, are linear with increasing width.

Studies have shown that the most effective implementations of the concepts of the present invention include the design of disk slot broach angles which are as close to perpendicular as possible to the airfoil chord line. See FIG. 3. As can be seen, this results in a substantial number of slot crossings beneath each blade and a maximized number of possible root lugs. Practical limitations such as an inability of the disk material to carry tooth bending loads may limit the broach angle to values on the order of thirty degrees (30°) or less.

Disk curvature at large broach angles need be considered. Blades cannot be installed on wide disks if the slots are machined straight across the rim at the required broach angle. This problem is particularly acute for short, squatty disks commonly required in the initial low pressure compressor stages of gas turbine engines. Disk curvature in such embodiments is accounted for by shaping the slots and lugs to the helical geometry depicted in the drawing.

It should be understood that the invention is not limited to the particular embodiments shown and described herein, but that various changes and modifications may be made without departing from the spirit and scope of this novel concept as defined by the following claims.

I claim:
1. A rotor assembly comprising:
   a plurality of rotor blades each having a blade chord line and each having at least three root lugs formed to a helical geometry and disposed along the blade essentially perpendicularly to said chord line; and
   a rotor disk having at least three parallel slots extending from the front face to the rear face across the periphery of the disk for engaging said root lugs.
2. The invention according to claim 1 wherein the angle of advance of the slots is on the order of thirty degrees (30°).
3. The invention according to claim 1 wherein said slots and blade lugs are configured to an interlocking "dovetail" shaped contour.
4. The invention according to claim 1 wherein said slots and blade lugs are configured to an interlocking "fir tree" shaped contour.

* * * * *